(12) United States Patent
Holmes et al.

(10) Patent No.: US 6,668,568 B2
(45) Date of Patent: Dec. 30, 2003

(54) FLEXIBLE SEALED SYSTEM AND FAN CONTROL ALGORITHM (75) Inventors: John S. Holmes, Sellersburg, IN (US); Jerry J. Queen, II, New Albany, IN (US); Robert M. Bultman, Prospect, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/754,591

(22) Filed: Jan. 5, 2001

(65) Prior Publication Data
US 2003/0005713 A1 Jan. 9, 2003

(51) Int. Cl.7 .......................... F25B 41/00; F25D 17/04
(52) U.S. Cl. .......................................... 62/187; 62/203
(58) Field of Search ........................ 62/187, 186, 208, 62/209; 705/7

(56) References Cited

U.S. PATENT DOCUMENTS

| 4,555,057 A | 11/1985 | Foster |
| 4,604,871 A | 8/1986 | Chiu et al. |
| 4,707,684 A | 11/1987 | Janke et al. |
| 4,834,169 A | 5/1989 | Tershak et al. |
| 4,841,735 A | 6/1989 | Oike |
| 4,949,550 A | 8/1990 | Hanson |
| 5,123,253 A | 6/1992 | Hanson et al. |
| 5,136,865 A | 8/1992 | Aoki et al. |
| 5,187,941 A | 2/1993 | Tershak et al. |
| 5,220,806 A * | 6/1993 | Jaster et al. ................... 62/179 |
| 5,476,672 A | 12/1995 | Kim |
| 5,477,699 A * | 12/1995 | Guess et al. ................... 62/187 |
| 5,524,447 A * | 6/1996 | Shim ............................. 62/209 |
| 6,101,826 A * | 8/2000 | Bessler ......................... 62/187 |
| 6,286,326 B1 * | 9/2001 | Kopko ........................... 62/179 |
| 6,315,909 B1 * | 11/2001 | Hoots et al. .................. 210/745 |

* cited by examiner

Primary Examiner—Marc Norman
(74) Attorney, Agent, or Firm—H. Neil Houser, Esq.; Armstrong Teasdale LLP (57) ABSTRACT In one aspect, the present invention relates to a refrigeration control system that is modular and contains an algorithm to control the energy and temperature performance of side-by-side, top mount, and bottom mount type refrigerators. The control algorithm uses a two-dimensional control grid to determine the state of the refrigeration system based on the temperature of the freezer compartment and the fresh food compartment. The control algorithm then controls the rate of the fresh food fan, evaporator fan, and the damper and to bring the refrigerator-freezer to a desired state and maintain that state.

28 Claims, 9 Drawing Sheets

| | FF No Freeze | FF Low Hysteresis | FF Target Temp |
|---|---|---|---|
| FZ Ex High Limit | F SS OFF<br>Evap. OFF<br>Damper Closed<br>FF Fan OFF | E SS On<br>Evap. High<br>Damper Closed<br>FF Fan OFF | D SS On<br>Evap. High<br>Damper NC (1)<br>FF Fan NC |
| FZ High Hysteresis | L SS OFF<br>Evap. OFF<br>Damper Closed<br>FF Fan OFF | K SS On<br>Evap. Low (2)<br>Damper Closed<br>FF Fan OFF | J SS On<br>If Evap. Off<br>  then Evap. Low (2)<br>  else Evap. NC<br>Damper NC (1)<br>FF Fan NC |
| FZ Target Temp | R SS OFF<br>Evap. OFF<br>Damper Closed<br>FF Fan OFF | Q SS NC<br>If SS On<br>  then Evap. Low (2)<br>  else Evap. OFF<br>Damper Closed<br>FF Fan OFF | P SS NC<br>Evap. NC<br>Damper NC<br>FF Fan NC |
| FZ Low Hysteresis | X SS OFF<br>Evap. OFF<br>Damper Closed<br>FF Fan OFF | W SS OFF<br>Evap. OFF<br>Damper Closed<br>FF Fan OFF | V SS OFF<br>If Damper Closed or<br>  Evap. Low,<br>  then Evap. OFF<br>  else Evap. NC<br>If Evap. OFF,<br>  then Damper Closed<br>  else Damper NC<br>If Evap. OFF,<br>  then FF Fan OFF<br>  else FF Fan NC |

NOTE (1): DAMPER OPENS & FF FAN ON LOW AT SS START, THEN CHECKS FOR PROPER POSITION NEXT LOGIC CYCLE
NOTE (2): FOR BPO & QUANTUM EVAP LOW = EVAP MEDIUM

Note: The circles indicate potential stability problems

FIG. 5A      FIG. 5B →

| | | | |
|---|---|---|---|
| C SS On<br>Evap. High<br>Damper Open<br>if FF FAN High then<br>FF FAN NC else FF<br>FAN LOW | B SS On<br>Evap. High<br>Damper Open<br>If FF FAN High then FF<br>FAN NC else FF FAN LOW | A SS On<br>Evap. High<br>Damper Open<br>FF Fan High | |
| I SS On<br>Evap. Med.<br>Damper Open<br>if FF FAN High then<br>FF FAN NC else FF<br>FAN LOW | H SS On<br>If Evap. High,<br>  then Evap. NC<br>  else Evap. Med.<br>Damper Open<br>If FF FAN High then FF<br>FAN NC else FF FAN LOW | G SS On<br>Evap. High<br>Damper Open<br>FF Fan High | |
| O SS NC<br>Evap. NC<br>Damper Open<br>FF Fan NC | N If EFOSSO,<br>  then SS NC<br>  else SS ON<br>If Evap. High,<br>  then Evap. NC<br>  else Evap. Med.<br>Damper Open<br>If FF FAN High then FF<br>FAN NC else FF FAN LOW | M If EFOSSO,<br>  then SS NC<br>  else SS ON<br>Evap. High<br>Damper Open<br>FF Fan High | |
| U SS NC<br>Evap. NC<br>Damper Open<br>FF Fan NC | T If EFOSSO,<br>  then SS NC<br>  else SS ON<br>If Evap. High,<br>  then Evap. NC<br>  else Evap. Med.<br>Damper Open<br>If FF FAN High then FF<br>FAN NC else FF FAN LOW | S If EFOSSO,<br>  then SS NC<br>  else SS ON<br>Evap. High<br>Damper Open<br>FF Fan High | |
| FF High Hysteresis | FF Alarm | FF High | |

FLEXIBLE SEALED SYSTEM AND FAN CONTROL ALGORITHM

BACKGROUND OF THE INVENTION

This invention relates generally to refrigeration devices, and more particularly, to control systems for refrigerators.

Current appliance revitalization efforts require electronic subsystems to operate different appliance platforms. For example, known household refrigerators include side-by-side single and double fresh food and freezer compartments, top mount, and bottom mount type refrigerators. A different control system is used in each refrigerator type. For example, a control system for a side-by-side refrigerator controls the freezer temperature by controlling operation of a mullion damper. Such refrigerators may also include a fresh food fan and a variable or multi-speed fan evaporator fan. Top mount refrigerators and bottom mount refrigerators are available with and without a mullion damper, the absence or presence of which affects the refrigerator controls. Therefore, control of the freezer temperature in top and bottom mount type refrigerators is not via control of a mullion damper.

In addition, each type of refrigerator, i.e., side-by-side, top mount, and bottom mount, have different optimal control algorithms for most efficiently controlling refrigerator operation. Conventionally, different control systems have been employed to control different refrigerator platforms, which is undesirable from a manufacturing and service perspective.

BRIEF SUMMARY OF THE INVENTION

In an exemplary embodiment, an adaptive control system is provided for a refrigeration system including a fresh food compartment and a freezer compartment with a damper establishing flow communication therebetween, a sealed system for forcing cold air through the refrigerator compartments and having an evaporator fan and a fresh food compartment fan. The controller is operatively coupled to the damper, the evaporator fan and the fresh food fan, and the controller is configured to accept a plurality of control inputs, determine a state of the refrigeration system in a two-dimensional logic control grid based upon the control parameter inputs, and execute an optimal control algorithm for the determined state of the refrigeration system.

More specifically, the controller includes a processor and a memory, and is configured to read data corresponding to a fresh food compartment condition and data corresponding to a freezer compartment condition. The memory is loaded with a two-dimensional logic control grid including a first axis and a second axis corresponding to fresh food compartment temperature and freezer compartment temperature, respectively. The axes of the grid are partitioned into a plurality of temperature ranges for the respective refrigerator compartments, and the partitions of the first and second axes define a plurality of states in the control grid. Each state contains control parameter settings to maintain that state in the control grid, or to drive the refrigerator into another state in the control grid, and ultimately to drive the refrigerator to a steady state wherein target temperatures are maintained in each of the fresh food compartment and the freezer compartment.

The controller is configured to periodically determine actual fresh food compartment and freezer compartment temperatures, input the temperatures to the control grid, and locate an applicable state in the control grid based upon the determined temperatures. The controller also reads current control parameter setting from system memory, and compares the current control parameters to desired control parameter values determined by the located control grid state. The control parameters are then adjusted to the desired values if the current values are different than the desired values.

The grid may be dynamically reconfigured to form a desired number of states in the control grid by setting partition points of the first and second axes equal to one another or to values that effectively eliminate certain grid states in operation. The controller is also configured to automatically configure itself to a refrigerator platform in which it is installed. A single adaptive control system is therefore provided that is applicable to a variety of refrigerator platforms.

DETAILED DESCRIPTION OF THE INVENTION

Figure 1:
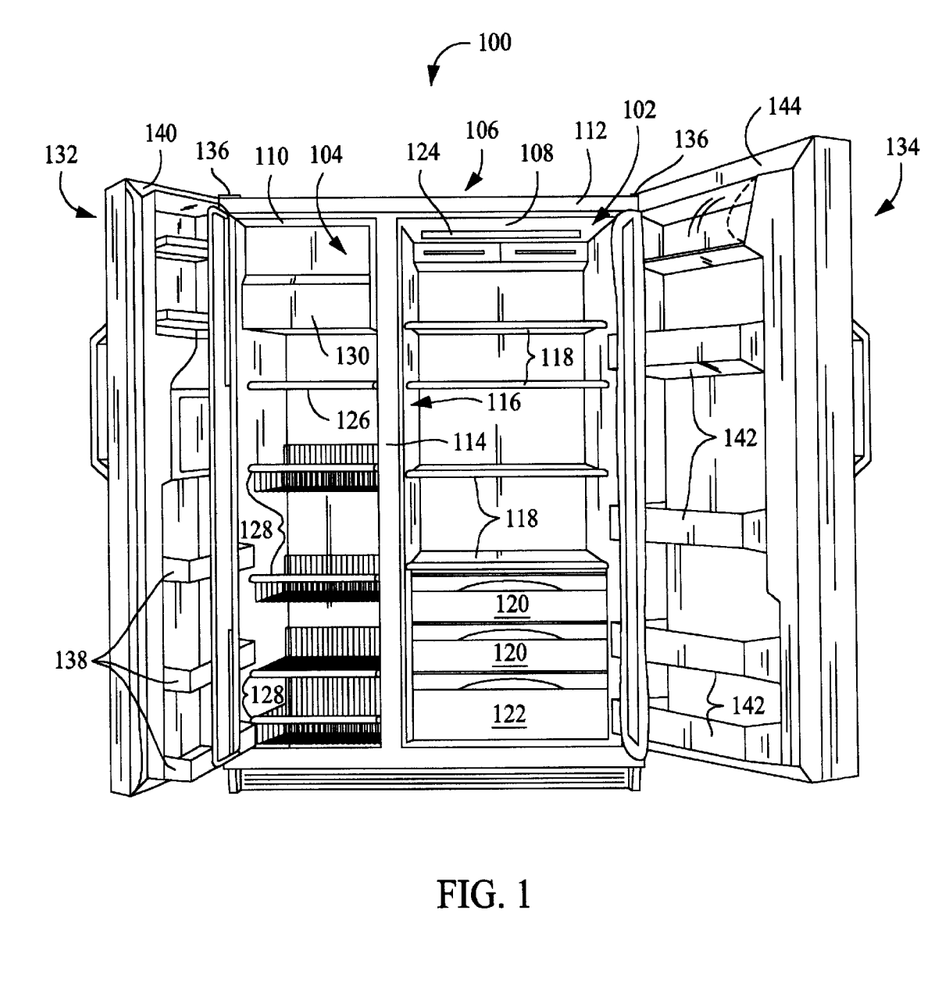
FIG. 1 is a perspective view of an exemplary refrigerator.

FIG. 1 illustrates a side-by-side refrigerator 100 in which the present invention may be practiced. It is recognized, however, that the benefits of the present invention apply to other types of refrigerators, freezers, and refrigeration appliances wherein frost free operation is desirable. Consequently, the description set forth herein is for illustrative purposes only and is not intended to limit the invention in any aspect.

Refrigerator 100 includes a fresh food storage compartment 102 and a freezer storage compartment 104. Freezer compartment 104 and fresh food compartment 102 are arranged side-by-side. A side-by-side refrigerator such as refrigerator 100 is commercially available from General Electric Company, Appliance Park, Louisville, Ky. 40225.

Refrigerator 100 includes an outer case 106 and inner liners 108 and 110. A space between case 106 and liners 108 and 110, and between liners 108 and 110, is filled with foamed-in-place insulation. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100. Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments, and a spaced wall of liners separating compartments, sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator or freezer compartments via fans (not shown in FIG. 1). Collectively, the vapor compression cycle components in a refrigeration circuit, associated fans, and associated compartments are referred to herein as a sealed system. The construction of the sealed system is well known and therefore not described in detail herein, and the sealed system is operable to force cold air through the refrigerator subject to the following control scheme.

Figure 2:
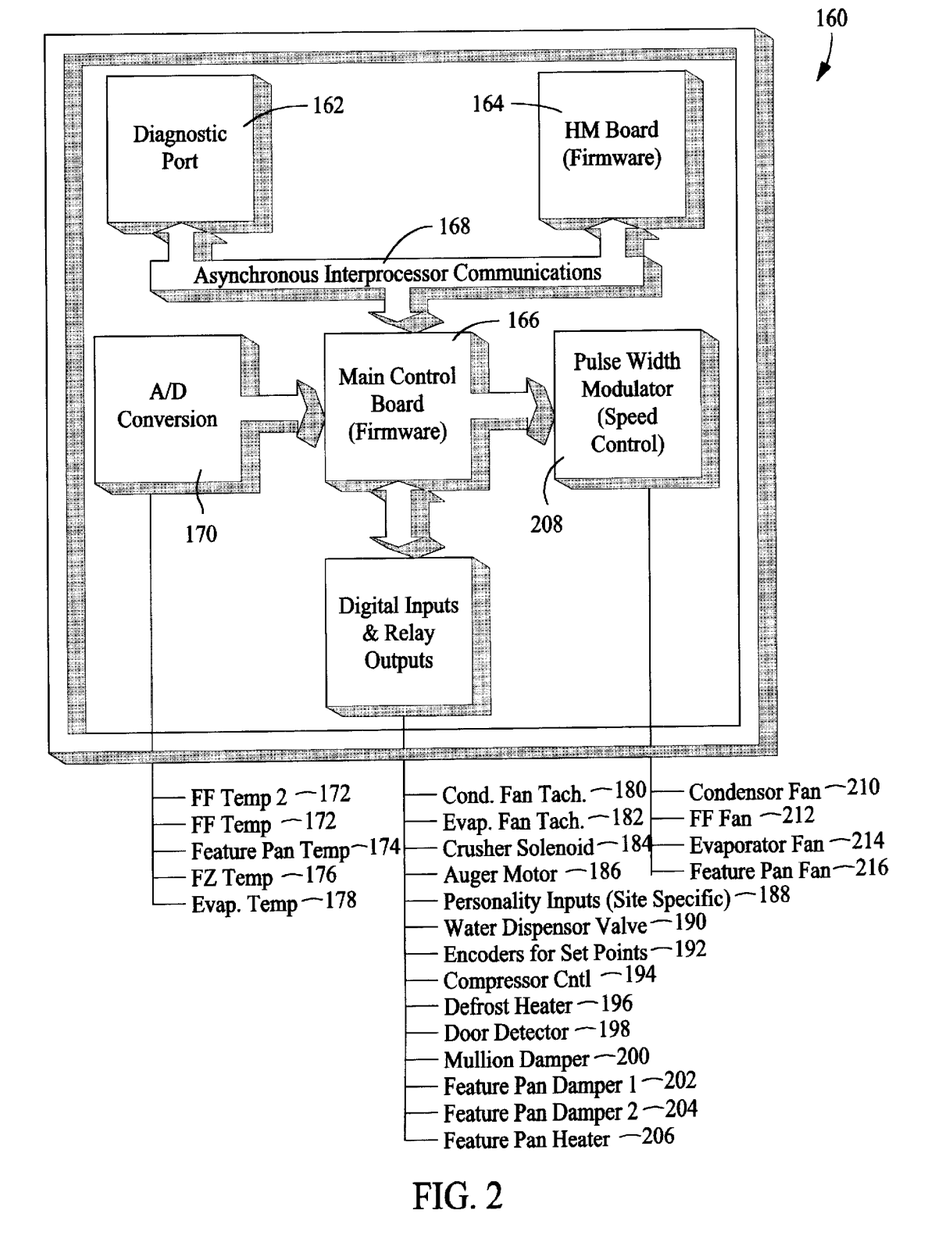
FIG. 2 is a block diagram of a refrigerator controller in accordance with one embodiment of the present invention.

FIG. 2 illustrates an exemplary controller 160 in accordance with one embodiment of the present invention. Controller 160 can be used, for example, in refrigerators, freezers and combinations thereof, such as, for example side-by-side refrigerator 100 (shown in FIG. 1).

Controller 160 includes a diagnostic port 162 and a human machine interface (HMI) board 164 coupled to a main control board 166 by an asynchronous interprocessor communcations bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 1) temperature sensors 174, freezer temperature sensors 176, external temperature sensors (not shown in FIG. 2), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), analog pressure sensing of the compressor sealed system for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate of various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a compressor control 194, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 210, a fresh food compartment fan 212, an evaporator fan 214, and a quick chill system feature pan fan 216.

Figure 3A:
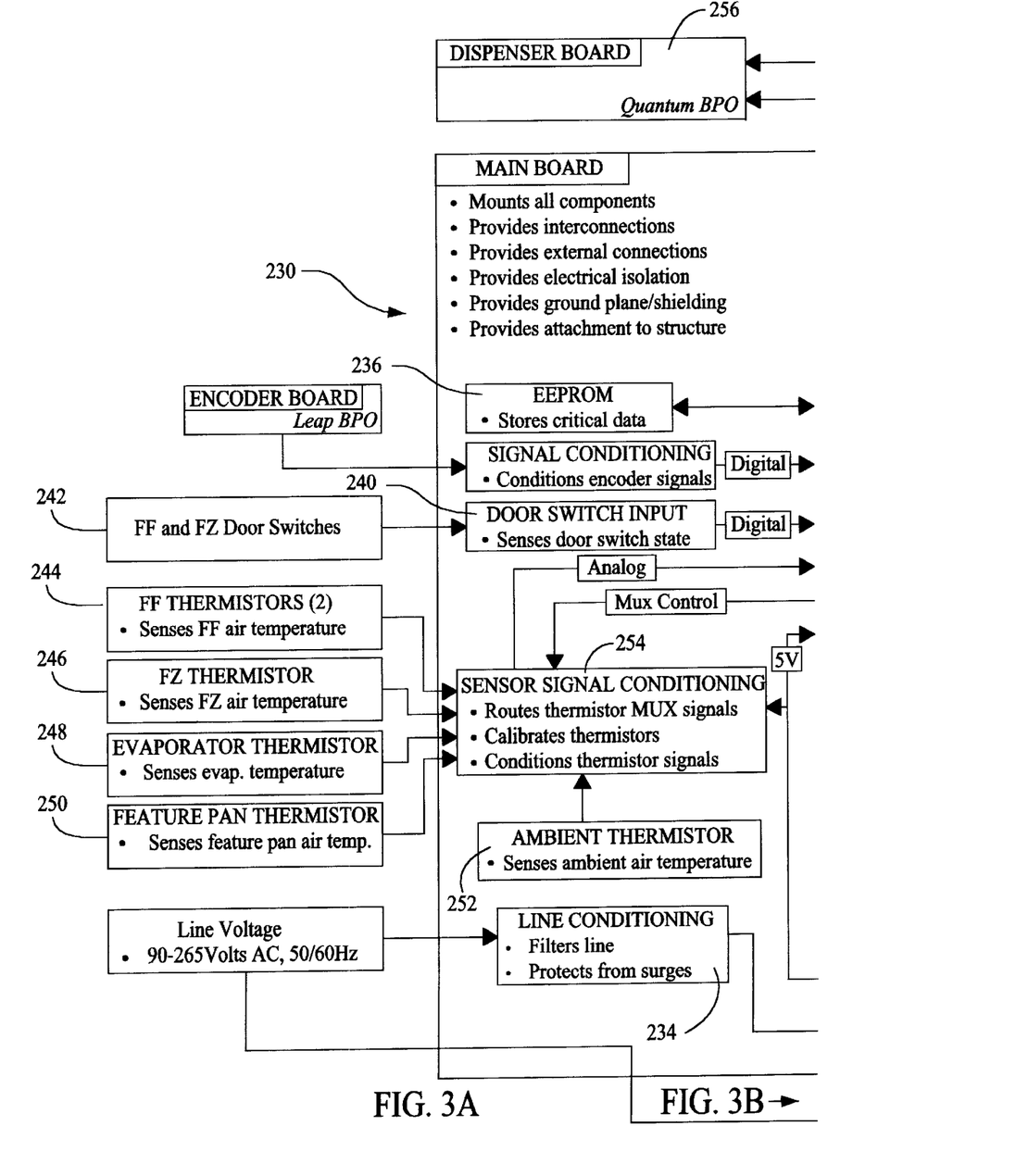
FIG. 3 is a block diagram of the main control board shown in FIG. 2.
Figure 3B:
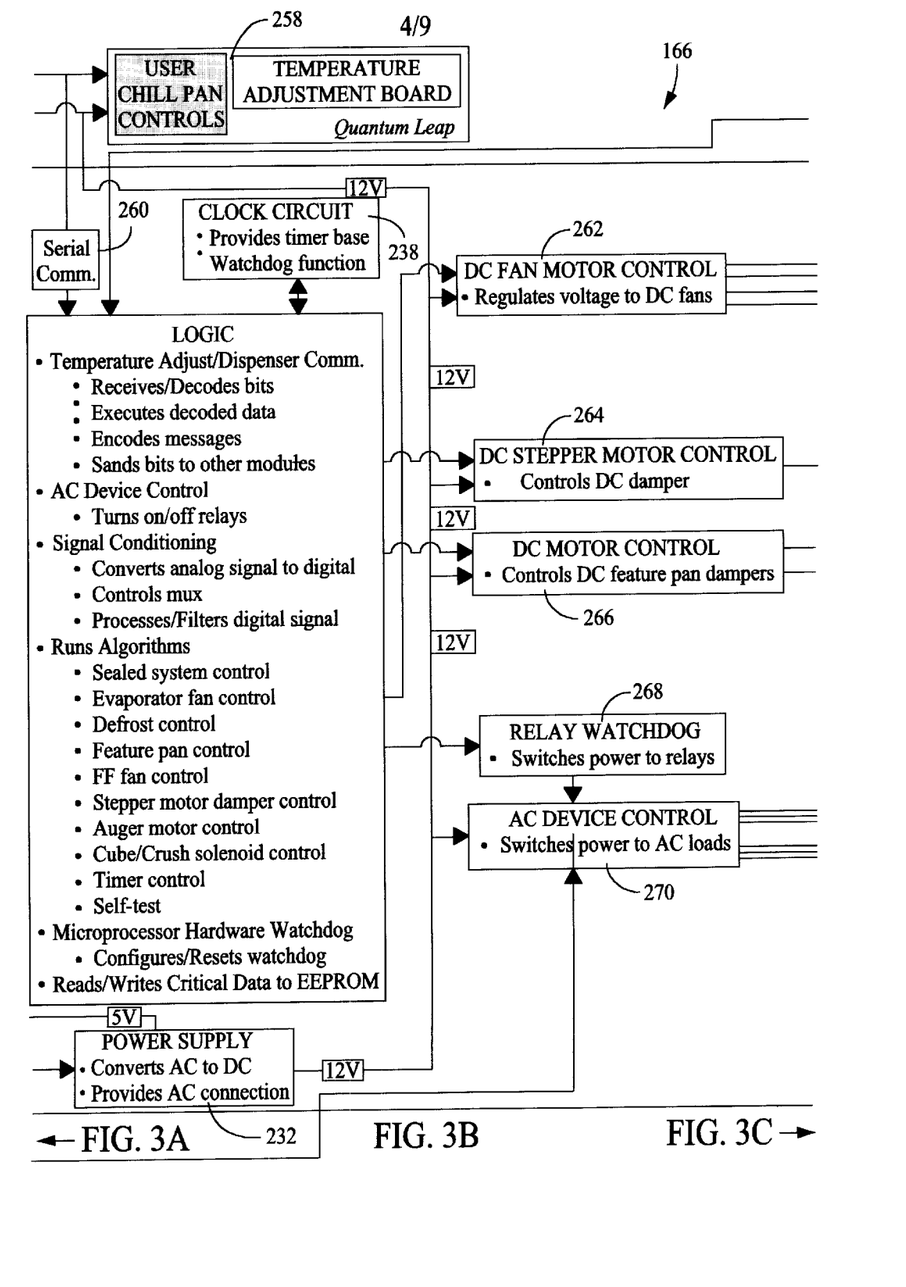
Figure 3C:
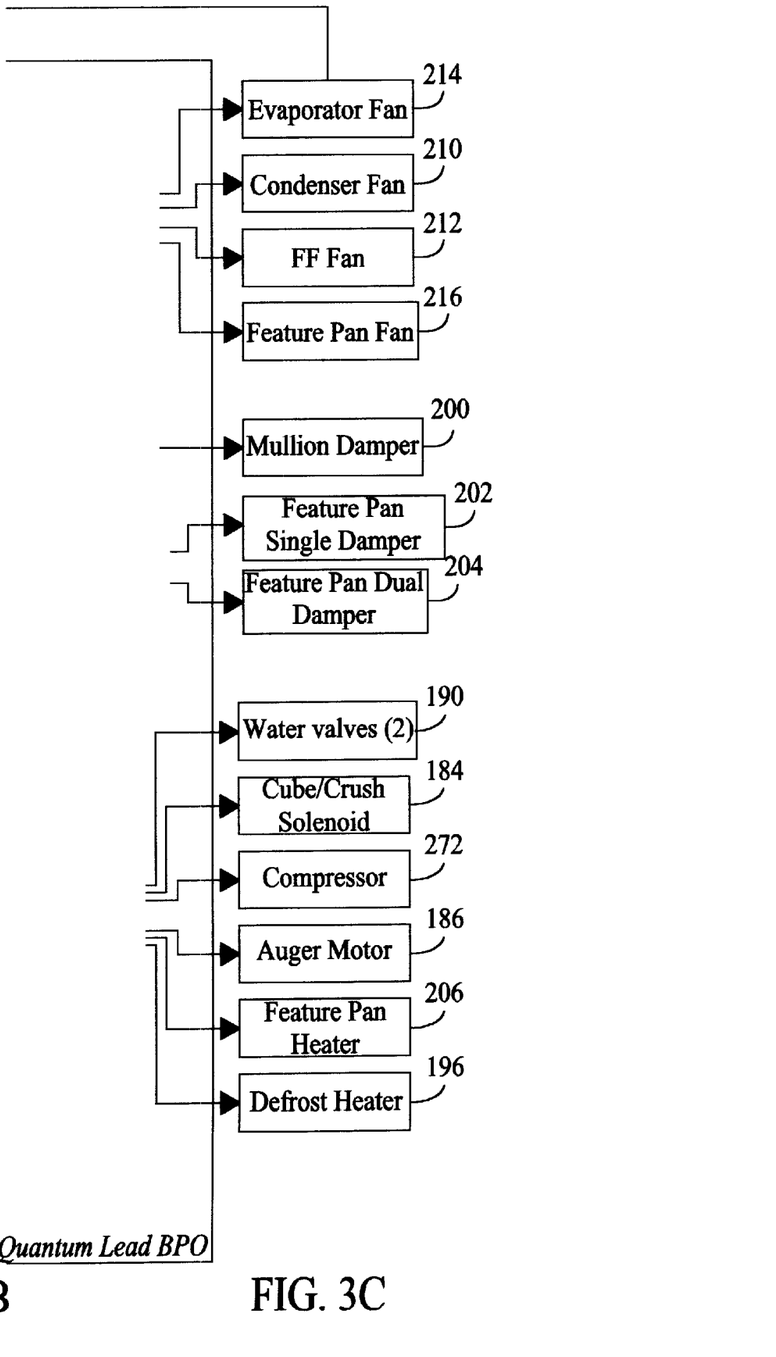
Figure 4:
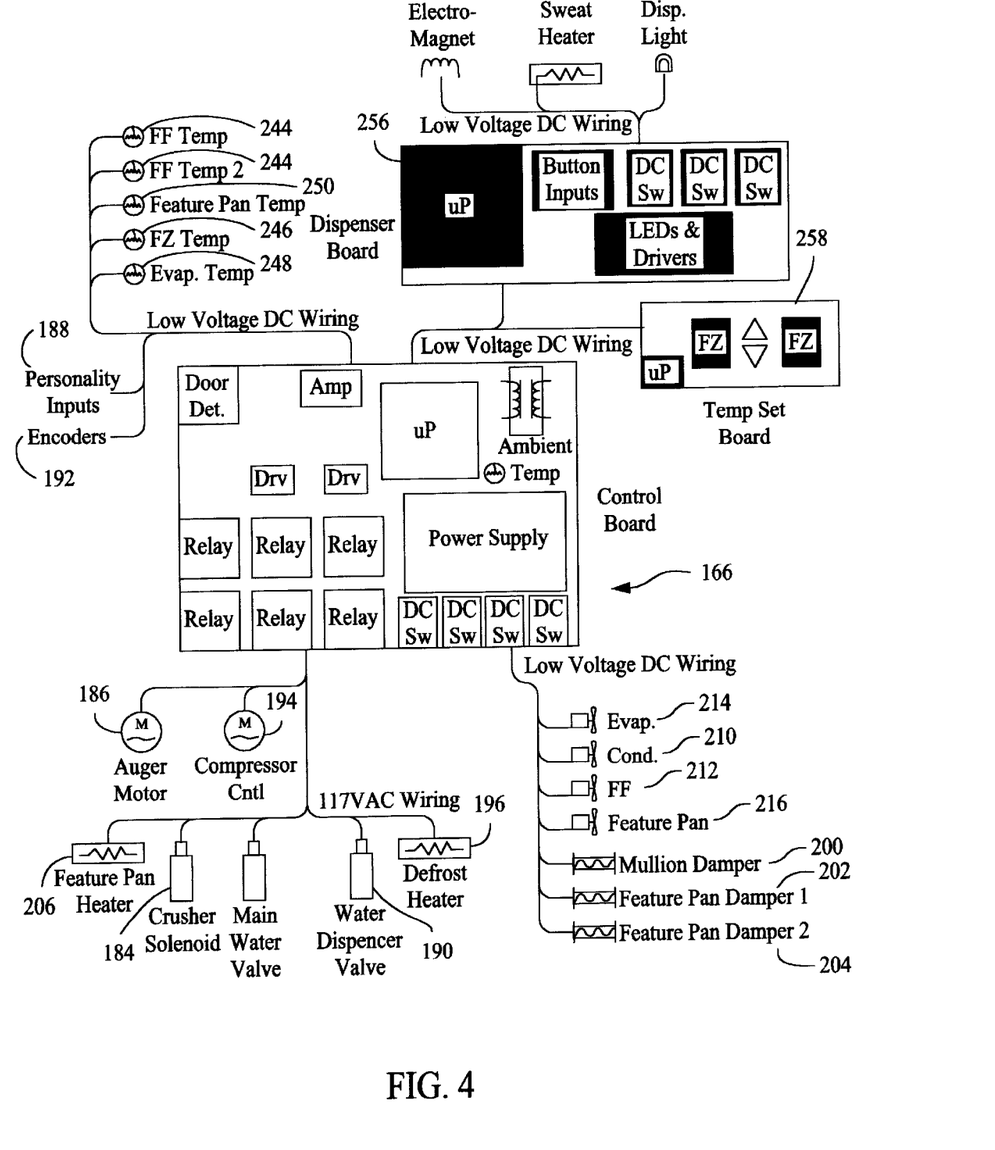
FIG. 4 is a block diagram of the main control board shown in FIG.

FIGS. 3 and 4 are more detailed block diagrams of main control board 166. As shown in FIGS. 3 and 4, main control board 166 includes a processor 230. Processor 230 performs temperature adjustments/dispenser communication, AC device control, signal conditioning, microprocessor hardware watchdog, and EEPROM read/write functions. In addition, processor executes many control algorithms including sealed system control, evaporator fan control, defrost control, feature pan control, fresh food fan control, stepper motor damper control, water valve control, auger motor control, cube/crush solenoid control, timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, a compressor 272, auger motor 186, a feature pan heater 206, and defrost heater 196. DC fan motor control 266 is coupled to evaporator fan 214, condenser fan 210, fresh food fan 212, and feature pan fan 216. DC stepper motor control 266 is coupled to mullion damper 200, and DC motor control 266 is coupled to one of more sealed system dampers.

Periodically, controller 160 reads fresh food compartment thermistors 244 and freezer thermistor 246 to determine respective temperatures of fresh food compartment 102 (shown in FIG. 1) and freezer compartment 104 (shown in FIG. 1). Based on the determined temperatures of compartments 102, 104, controller 160 makes control algorithm decisions, as described below.

Figure 5A:
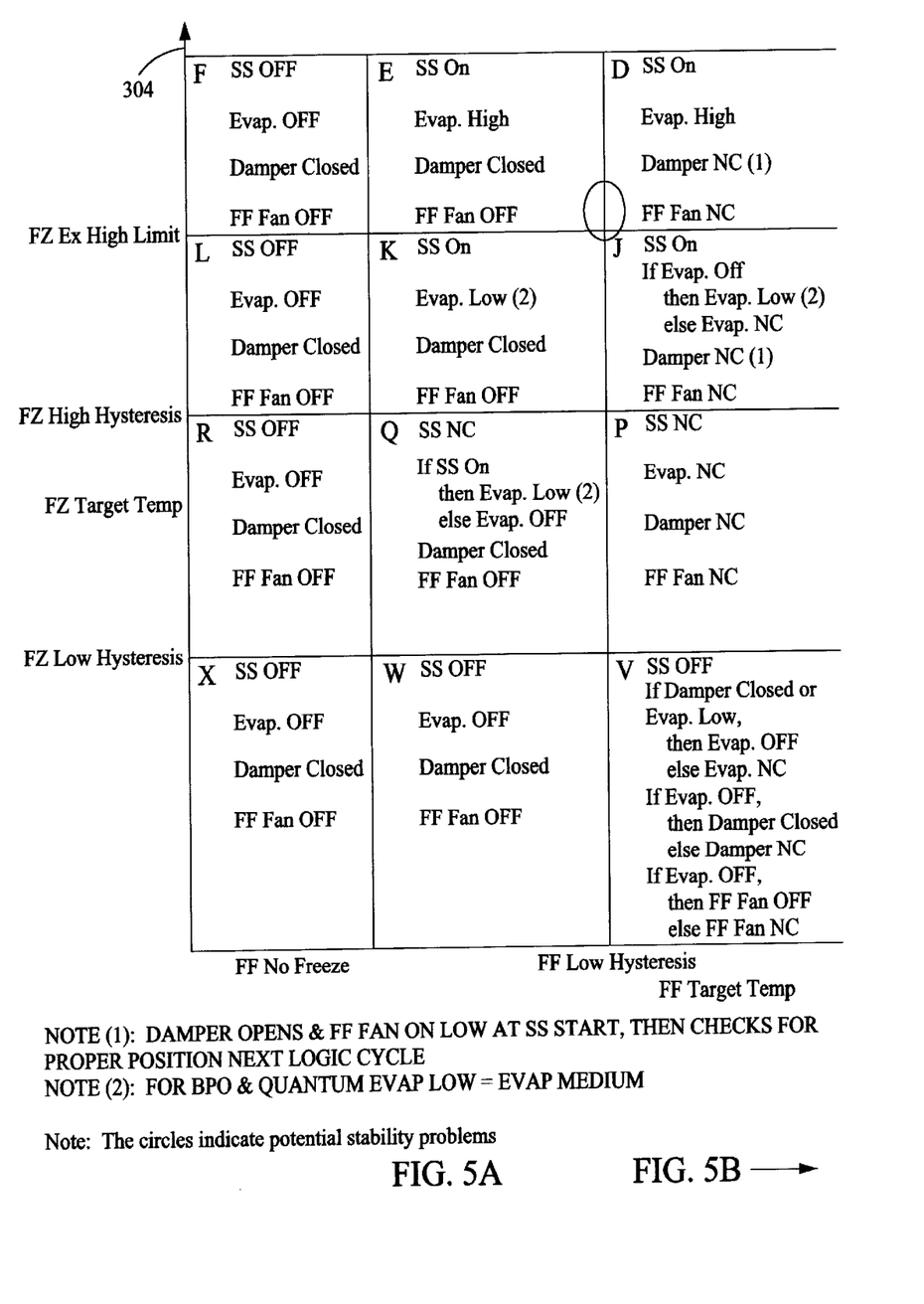
FIG. 5 is an exemplary logic control grid executable by the controller shown in FIGS. 2–4.
Figures 5A, 5B:
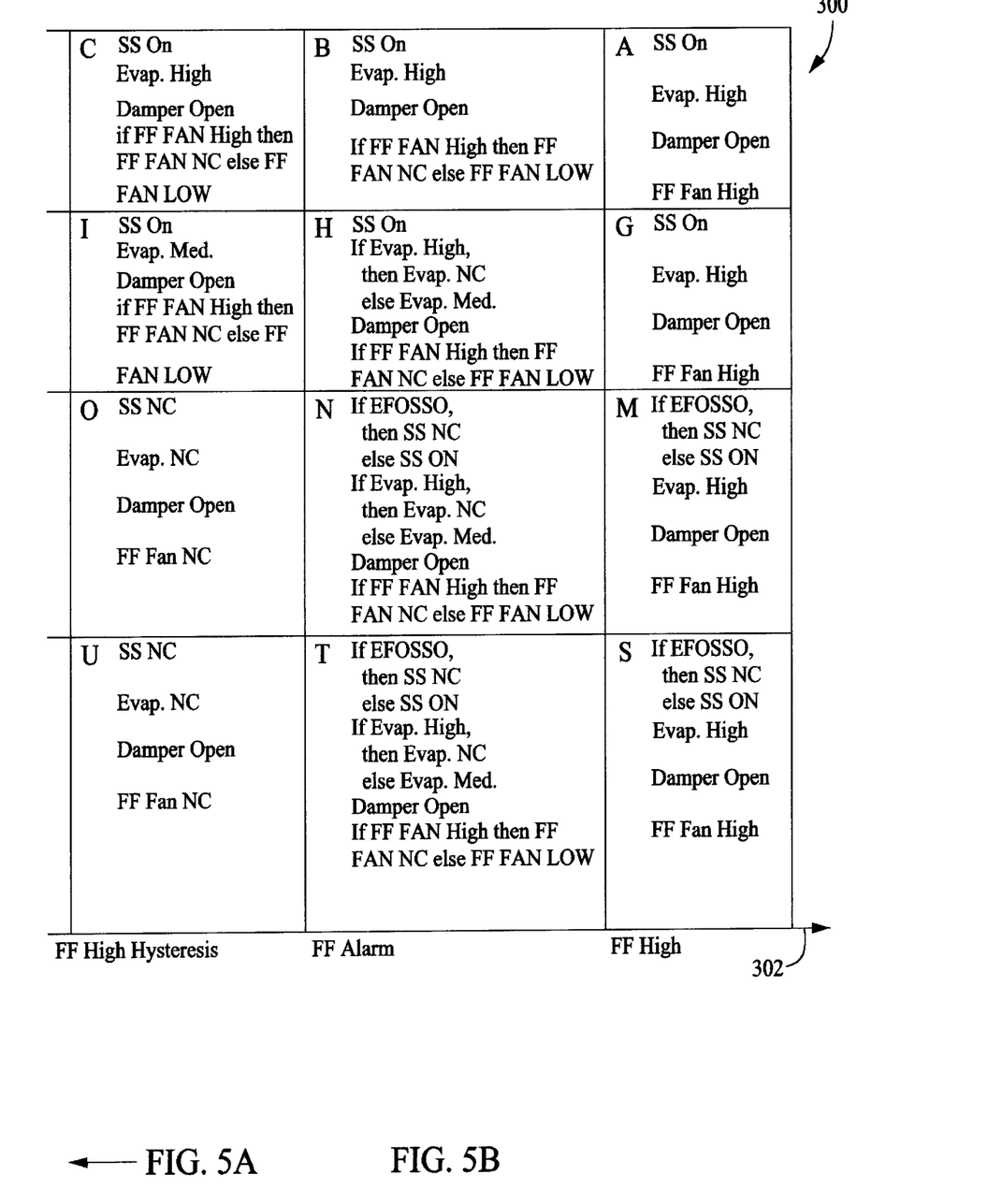

FIG. 5 illustrates an exemplary logic control grid 300 executable by controller 160 to automatically configure itself for optimum control, irrespective of the refrigerator platform on which it is installed, such as refrigerator 100 (shown in FIG. 1). Controller also dynamically reconfigures control grid 300 for an optimal platform control algorithm architecture. As used herein, an "optimal algorithm" is one that efficiently drives a refrigerator platform from a given operational state toward a steady state temperature at user-selected set points. As will become apparent below, the steady state temperature is achieved by execution of various "optimal" algorithms dependent upon actual temperature conditions of the refrigerator.

Control grid 300 includes a first axis 302 partitioned into a plurality of operating ranges of fresh food compartment 102 (shown in FIG. 1) temperatures, and a second axis 304 partitioned into a plurality of operating ranges of freezer compartment 104 (shown in FIG. 1) temperature. More specifically, first axis includes partitions defined by a fresh food compartment minimum allowable temperature (FF No Freeze), a fresh food compartment lower target temperature (FF Low Hysterisis), a fresh food compartment upper target temperature (FF High Hysterisis, a fresh food compartment alarm temperature (FF Alarm), and a high fresh food compartment temperature (FF High). Likewise, second axis includes partitions defined by a freezer compartment lower target temperature (FZ Low Hysterisis), a freezer compartment upper target temperature (FZ High Hysterisis), and a freezer compartment high temperature limit (FZ Ex High Limit). Actual temperatures that define the above-described partitions of first axis 302 and second axis 304 are refrigerator specific and dependant on refrigeration compartment setpoints.

In combination, the partitions of the first and second axes 302, 304 define a plurality of "states" of the refrigerator, and each operating point of refrigerator 100, as determined by respective temperatures of fresh food and freezer compartments 102, 104, is contained in one of the states of control grid 300. In the illustrated embodiment, control grid includes twenty four states labeled "A" through "X," but it is understood that greater or fewer states could be employed in alternative embodiments.

State "P" represents the desired steady state temperature of refrigerator 100 (shown in FIG. 1) established by user-selected set points of fresh food compartment temperature and freezer compartment temperature. Each state of control grid 300 contains an optimal algorithm (settings or rules) to adjust control parameters accordingly to drive the state of refrigerator 100 to state "P" and maintain an operational condition in state "P." Specifically, each control grid state includes a sealed system parameter, an evaporator fan speed parameter, a mullion damper parameter, and a fresh food fan parameter. Sealed system parameter is set to activate the refrigerator sealed system ("SS on"), deactivate the sealed system ("SS Off"), or no change ("SS NC") in which the current sealed system state is maintained. Evaporator fan speed parameter is set to off ("Evap. OFF"), low speed ("Evap. LOW"), medium speed ("Evap. Med.") high speed ("Evap. High) or no change (Evap. NC") and controller 160 operates evaporator fan 214 (shown in FIGS. 2–4) accordingly. Mullion damper parameter is set to actuate mullion damper 200 (shown in FIGS. 2–4) to a closed position ("Damper Closed"), an open position ("Damper Open") or no change ("Damper NC"). Fresh food fan parameter is set to operate fresh food fan 212 (shown in FIGS. 2–4) to off ("FF Fan Off"), low speed ("FF Fan Low") high speed ("FF Fan High") and no change ("FF Fan NC"). In alternative embodiments, other control parameters are used to accommodate specific sealed systems, other fan speeds, and other damper positions. For example, a two speed evaporator fan could be employed and the corresponding medium and low speeds in control grid 300 would be set to the same value in the data stream causing the effect of a two speed architecture.

As an illustrative example of operation of control grid 300, state "H" is located when the fresh food compartment 102 temperature is between FF Alarm and FF High, and when freezer temperature is between FZ High Hysteresis and Fz Ex High Limit. Once the state is determined, controller 160 (shown in FIGS. 2–4) adjusts values of the parameters according to the settings in state "H."

The fresh food fan parameter, evaporator fan parameter, sealed system parameter, and mullion damper parameter are read in as data by controller 160. The parameters are then adjusted according to the parameters, if necessary, to correspond to the "optimal" settings contained in state "H." Specifically, and referring to FIG. 5, in state "H" the SS parameter is set to "on" so that the sealed system is activated to cool refrigeration compartments 102, 104. If evaporator fan parameter is set to high it is unchanged. If evaporator parameter is not set to high then it is set to medium. Mullion damper parameter is set open, and if fresh food fan parameter is set high it is unchanged. If fresh food parameter is not set high it is set low. The adjusted settings of state "H" will drive refrigerator 100 to an adjacent state in control grid 300, such as state "I."

Once in state "I," control parameters are again read by controller 160 and adjusted according to the optimal settings in state "I." Once the settings are adjusted in state "I," refrigerator 100 is driven to another state adjacent to state "1."Thus, refrigerator 100 floats from state to state in control grid 160 as refrigerator 100 is used, and each state is configured to drive refrigerator toward a steady state at state "P" wherein both refrigeration compartment 102 and freezer compartment 104 are maintained at target temperatures.

Around the edges of control grid 300 are other data parameters that change the behavior of controller 160. For example, if FF ALARM is set equal to FF High on first axis 302, the column containing state "B," state "H," state "N," and state "T" effectively disappears so that control grid contains only twenty effective states rather than the illustrated twenty four. Likewise FF No Freeze on first axis 302 could be set to −20° F. in the data stream, effectively eliminating state "F," state "L," state "R," and state "X" from control grid 300. As such control grid 300 can be dynamically reconfigured to have 9, 12, 15, 16, 18, 20, or 24 states.

Figure 6:
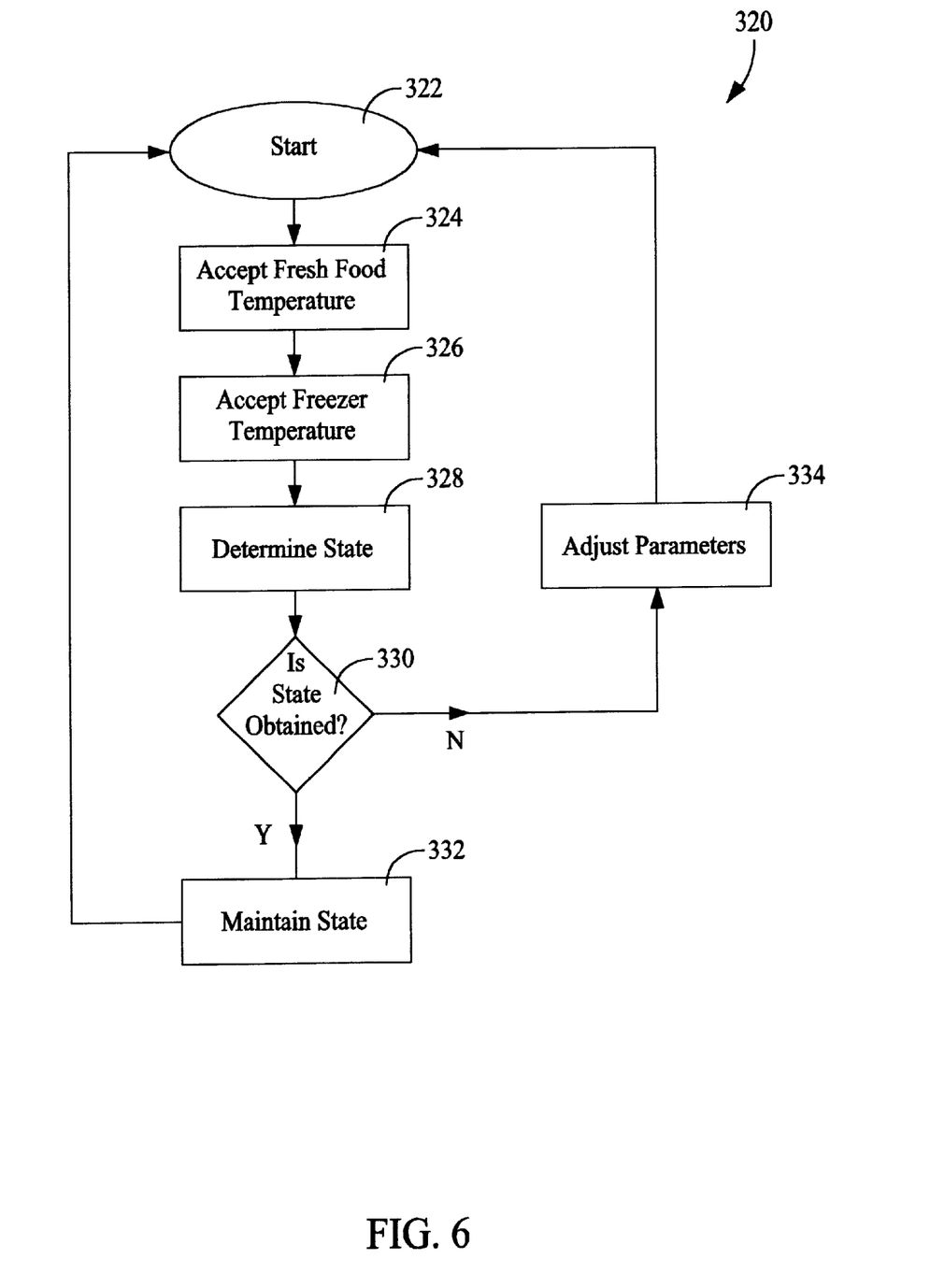
FIG. 6 is an energy performance and temperature performance flow chart.

FIG. 6 illustrates a control algorithm 320 for controlling energy performance and temperature performance of a refrigeration system using control grid 300 (shown in FIG. 5). Control algorithm begins 322 by reading 324 a fresh food compartment temperature with thermistors 244 (shown in FIGS. 3 and 4) and also reading 326 freezer compartment temperature using freezer thermistor 246 (shown in FIGS. 3 and 4). Using logic control grid 300, a current state of the refrigerator is determined 328.

Once the current state is determined, controller 160 checks 330 to see if the desired state has been obtained 330, i.e., whether actual control parameter settings correspond to the settings for the determined state in control grid 300. If the desired state has been obtained, then the current control parameters are maintained 332. However, if the desired state has not been obtained, control parameters are adjusted 334 to the settings of the determined state. The refrigerator system is then run at the appropriate settings until controller 160 restarts 322 algorithm 320 and reads 324, 326 refrigeration compartment temperatures.

Algorithm 320 fundamentally requires data input to operate in an appropriate manner. In one embodiment, the data input can be from permanent memory, such as Read-Only Memory (ROM) or Programmable Read-Only Memory (PROM). The data values are determined before the manufacture of the control system. In an alternative embodiment, the data is stored in non-volatile reprogrammable memory, such as Electrically Erasable Programmable Read-Only Memory (EEPROM) 236 (shown in FIG. 3) or battery backed up Random Access Memory (RAM) so that data values may be determined late in the manufacturing process, and so that data values may be updated in the field.

In one embodiment, access to the data is via Dual In-Line Package (DIP) switches. At manufacture time or service time, the installer sets the DIP switches to match the type of refrigerator in which the control is installed. Alternatively, wires in a refrigerator wiring harness are used to select the board's "personality". The appropriate algorithm and data are automatically selected by the control based on the personality of the refrigerator in which it was installed.

While the invention has been described in terms of various specific embodiments, those skilled in the art will recognize that the invention can be practiced with modification within the spirit and scope of the claims.

What is claimed is:

1. A method for controlling a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, the refrigerator further including a controller operatively coupled to the damper, the evaporator fan and the fresh food fan, said method comprising the steps of:
   accepting a plurality of control inputs;
   determining a state of the refrigeration system in a two-dimensional logic control grid based upon the control parameter inputs; and
   executing an optimal control algorithm for the determined state of the refrigeration system, wherein said step of executing the optimal control algorithm includes continuing to change the determined state to operate the refrigeration system in a new state until the new state reaches a steady state, the new state having parameters that are different than parameters of the control parameter inputs, the change being based on a set of rules, and the steady state being a state in which the fresh food and the freezer compartments are maintained at target temperatures.

2. A method in accordance with claim 1 wherein said step of accepting a plurality of control parameter inputs comprises the step of reading data corresponding to a fresh food compartment condition and data corresponding to a freezer compartment condition.

3. A method in accordance with claim 2 wherein said step of reading data comprises the step of reading a fresh food compartment temperature, a freezer compartment temperature, and at least one of an evaporator fan parameter, a fresh food fan parameter, a damper parameter, and a sealed system parameter.

4. A method in accordance with claim 1 further comprising the step of configuring the two-dimensional logic grid to contain a selected number of states.

5. A method in accordance with claim 4 wherein the grid comprises a first axis and a second axis, said step of configuring the two-dimensional logic grid comprises the step of partitioning the first and second axes of the grids, the partitions defining the control grid states.

6. A method in accordance with claim 1 wherein accepting a plurality of control inputs comprises the step of:
   inputting a fresh food compartment temperature and a freezer compartment temperature; and
   locating the applicable state in the control grid based upon the inputted fresh food compartment temperature and the freezer compartment temperature.

7. A method in accordance with claim 6 wherein said step of accepting a plurality of control inputs further comprises the step of accepting at least one of an evaporator fan parameter, a fresh food fan parameter, a damper parameter, and a sealed system parameter.

8. A control system for a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, said control system comprising:
   a controller operatively coupled to the damper, the evaporator fan and the fresh food fan, said controller configured to:
      accept a plurality of control parameter inputs;
      determine a state of the refrigeration system in a two-dimensional logic control grid based upon the control parameter inputs; and
      execute an optimal control algorithm for the determined state of the refrigeration system, wherein to execute the optimal control algorithm said controller configured to continue to change the determined state to operate the refrigeration system in a new state until the new state reaches a steady state, the new state having parameters that are different than parameters of the control parameter inputs, the change being based on a set of rules, and the steady state being a state in which the fresh food and the freezer compartments are maintained at target temperatures.

9. A control system in accordance with claim 8, said controller comprising a processor, said processor configured to read data corresponding to a fresh food compartment condition and data corresponding to a freezer compartment condition.

10. A control system in accordance with claim 9, said processor configured to read a fresh food compartment temperature, a freezer compartment temperature, and at least one of an evaporator fan parameter, a fresh food fan parameter, a damper parameter, and a sealed system parameter.

11. A control system in accordance with claim 8 said controller comprising a memory, said memory loaded with said two-dimensional logic grid, said grid configured to contain a selected number of states.

12. A control system in accordance with claim 11 wherein said grid comprises a first axis and a second axis, said first and said second axis of said grids comprising a plurality of partitions, said partitions defining said control grid states.

13. A control system in accordance with claim 8, said controller configured to:
input a fresh food compartment temperature and a freezer compartment temperature; and
locate an applicable state in said control grid based upon the inputted fresh food compartment temperature and the freezer compartment temperature.

14. A control system in accordance with claim 13, said inputs comprising at least one of an evaporator fan parameter, a fresh food fan parameter, a damper parameter, and a sealed system parameter.

15. A method for controlling a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, the refrigerator further including a controller operatively coupled to the damper, the evaporator fan and the fresh food fan, said method comprising the steps of:
accepting a plurality of control inputs;
determining a state of the refrigeration system in a two-dimensional logic control grid based upon the control parameter inputs, the grid including a first axis and a second axis;
executing an optimal control algorithm for the determined state of the refrigeration system; and
configuring the control grid to contain a selected number of states, wherein said step of configuring comprises the step of partitioning the first axis according to ranges of fresh food compartment temperature, the ranges defined by a fresh food compartment lower target temperature, a fresh food compartment upper target temperature, and at least one of a fresh food compartment minimum allowable temperature, a fresh food compartment alarm temperature and a fresh food compartment high temperature.

16. A method in accordance with claim 15 wherein said step of configuring the control grid comprises the step of partitioning the second axis according to ranges of freezer compartment temperature, the ranges defined by a freezer compartment lower target temperature, a freezer compartment upper target temperature, and at least a freezer compartment high temperature limit.

17. A method for controlling a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, the refrigerator further including a controller operatively coupled to the damper, the evaporator fan and the fresh food fan, said method comprising the steps of:
accepting a plurality of control parameter inputs, wherein said step of accepting comprises the steps of:
inputting a fresh food compartment temperature and a freezer compartment temperature; and
accepting at least one of an evaporator fan parameter, a fresh food fan parameter, a damper parameter, and a sealed system parameter;
determining a state of the refrigeration system in a two-dimensional logic control grid based upon the control parameter inputs; and
executing an optimal control algorithm for the determined state of the refrigeration system; wherein said step of executing the optimal control algorithm includes:
comparing set values of the evaporator fan parameter, the fresh food fan parameter, the damper parameter, and the sealed system parameter with desired values determined by the located control grid state; and
adjusting the evaporator fan parameter, the fresh food fan parameter, the damper parameter, and the sealed system parameter to the desired values if the set values are different than the desired values.

18. A method in accordance with claim 17 wherein said step of adjusting the damper parameter comprises the step adjusting the damper parameter to at least an open value and a closed value.

19. A method in accordance with claim 17 wherein said step of adjusting the fresh food fan parameter comprises the step of adjusting the fresh food fan parameter to at least one of an off value, a low speed value, and a high speed value.

20. A method in accordance with claim 17 wherein said step of adjusting the evaporator fan parameter comprises the step of adjusting the evaporator fan parameter to at least one of a off value, a low value, medium value and a high value.

21. A method in accordance with claim 17 wherein said step of adjusting the sealed system parameter comprises the step of adjusting the sealed system parameter to at least one of an off position and an on position.

22. A control system for a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, said control system comprising:
a controller operatively coupled to the damper, the evaporator fan and the fresh food fan, said controller comprising a memory, said memory loaded with a two-dimensional logic control grid, said grid configured to contain a selected number of states and to include a first axis and a second axis, said first and said second axis comprising a plurality of partitions defining said states, said first axis is partitioned according to ranges of fresh food compartment temperature, said ranges defined by a fresh food compartment lower target temperature, a fresh food compartment upper target temperature, and at least one of a fresh food compartment minimum allowable temperature, a fresh food compartment alarm temperature, and a fresh food compartment high temperature, said controller configured to:
accept a plurality of control parameter inputs;
determine a state of the refrigeration system in said grid based upon the control parameter inputs; and execute an optimal control algorithm for the determined state of the refrigeration system.

23. A control system in accordance with claim 22 wherein said second axis is partitioned according to ranges of freezer compartment temperature, said ranges defined by a freezer compartment lower target temperature, a freezer compartment upper target temperature, and at least a freezer compartment high temperature limit.

24. A control system for a refrigeration system, the refrigeration system including a fresh food compartment and a freezer compartment with a damper establishing flow communication therebetween, a sealed system for forcing cold air through the refrigerator compartments, the sealed system including an evaporator fan and a fresh food compartment fan, said control system comprising:

a controller operatively coupled to the damper, the evaporator fan and the fresh food fan, said controller configured to:
accept a plurality of control parameter inputs, wherein to accept the plurality of inputs said controller configured to input a fresh food compartment temperature and a freezer compartment temperature; and
determine a state of the refrigeration system in a two-dimensional logic control grid based upon the control parameter inputs; and
execute an optimal control algorithm for the determined state of the refrigeration system, wherein to execute the optimal control algorithm said controller configured to:
compare set values of an evaporator fan parameter, a fresh food fan parameter, a damper parameter, and a sealed system parameter with desired values determined by said determined state; and
adjust said evaporator fan parameter, said fresh food fan parameter, said damper parameter, and said sealed system parameter to said desired values if said set values are different than said desired values.

25. A control system in accordance with claim 24, said controller configured to adjust said damper parameter to at least an open value and a closed value.

26. A control system in accordance with claim 24, said controller configured to adjust said fresh food fan parameter to at least one of an off value, a low speed value, and a high speed value.

27. A control system in accordance with claim 24, said controller configured to adjust said evaporator fan parameter to at least one of an off value, a low value, a medium value and a high value.

28. A control system in accordance with claim 24, said controller configured to adjust said sealed system parameter comprises the step of adjusting the sealed system parameter to at least one of an off position and an on position.

* * * * *